United States Patent [19]

Marsing

[11] 4,242,534
[45] Dec. 30, 1980

[54] SUPERCONDUCTOR STRUCTURE AND METHOD FOR MANUFACTURING SAME

[75] Inventor: Helmut Marsing, Neunkirchen a. Br., Fed. Rep. of Germany

[73] Assignee: Siemens Aktiengesellschaft, Berlin & Munich, Fed. Rep. of Germany

[21] Appl. No.: 14,426

[22] Filed: Feb. 23, 1979

[30] Foreign Application Priority Data

Mar. 6, 1978 [DE] Fed. Rep. of Germany ....... 2809573

[51] Int. Cl.³ .............................................. H01B 7/34
[52] U.S. Cl. ................................... 174/15 S; 156/51; 156/52; 156/53; 156/54; 156/56; 428/72; 428/76; 428/182; 428/188
[58] Field of Search ................. 428/182, 188, 72, 76, 428/364; 156/86, 51, 52, 53, 54, 56; 174/15 R, 15 CA, 128 S, 15 S

[56] References Cited

U.S. PATENT DOCUMENTS

| 2,995,616 | 8/1961 | Nicolas | 156/56 |
| 3,430,337 | 3/1969 | Kelley | 156/54 |
| 3,470,508 | 9/1969 | Donadieu et al. | 174/128 S |
| 3,622,687 | 11/1971 | Doughty | 156/52 |
| 3,639,672 | 2/1972 | Kafka | 174/128 S |
| 3,679,537 | 7/1972 | Huer et al. | 428/184 |
| 3,708,606 | 1/1973 | Shattes et al. | 174/128 S |
| 3,900,702 | 8/1975 | Albrecht et al. | 174/128 S |

FOREIGN PATENT DOCUMENTS

| 2033459 | 1/1972 | Fed. Rep. of Germany | 174/15 S |
| 2519462 | 6/1975 | Fed. Rep. of Germany | 156/52 |
| 2619992 | 11/1977 | Fed. Rep. of Germany | 156/52 |

Primary Examiner—Stanley S. Silverman
Attorney, Agent, or Firm—Kenyon & Kenyon

[57] ABSTRACT

A superconductor structure with a stabilized superconductor, is surrounded by a jacket of a reinforcement material, comprising a preprofiled metal sheet which is bent around the superconductor and contains strip-like zones which extend in the lengthwise direction of the conductor and are in contact with the superconductor, and strip-like zones in between which are spaced from the surface of the superconductor, with filler strips of predetermined thickness arranged in the channel like outer depressions of the jacket.

14 Claims, 2 Drawing Figures

SUPERCONDUCTOR STRUCTURE AND METHOD FOR MANUFACTURING SAME

BACKGROUND OF THE INVENTION

This invention relates to superconductors in general and more particularly to a superconductor structure with at least one inner, ribbon-shaped superconductor which is stabilized by a normally conducting material and is surrounded by a jacket which consists of a material of higher mechanical strength than the normally conducting stabilizing material and the interior of which is provided with cavities for conducting a cooling medium in the lengthwise direction of the conductor and to a method for manufacturing such a superconductor structure.

To generate strong magnetic fields of large physical dimensions, magnet windings with superconductors can be used to advantage. Examples of conductor materials useful for this purpose include, for instance, niobium-zirconium or niobium-titanium alloys as well as niobium-tin compounds. Conductors of these superconductive materials are generally stabilized with normally conducting material; for instance, they are stabilized by embedding them in a matrix of this material. This measure aids in preventing destruction of the superconductors in the event of an uncontrollable transition of their portions consisting of the superconductive material from the superconducting to the normally conducting state. When the superconductors are cooled by means of a coolant, generally by means of liquid helium, to a temperature below the so-called critical temperature of the superconductor used for the conductors, their ohmic resistance almost completely disappears. Because of the correspondingly reduced power requirement, superconductor magnets therefore have the advantage, over conventional magnets with windings of electrically normally conducting material such as, for instance, copper, that stronger magnetic fields, and, therefore, also higher magnetic field gradients can be obtained with them. Such superconducting magnet windings are advantageously suited for fusion reactors, the strong magnetic fields of which are used to hold a hot plasma together by means of magnetic forces and to thereby make possible a fusion process in the plasma. In addition, corresponding superconducting windings can also be used for deflecting or focussing charged particles, for instance, in particle accelerators.

The windings of such superconducting magnets must often be constructed from several winding layers. The superconductors are subjected, depending on the current loading and the number of turns of the magnets, to tensile forces in the lengthwise direction of the conductors and to compression forces at right angles to the conductor axis. The superconductors must be able to absorb these factors without danger that their portions consisting of superconductive material might get damaged due to deformation. In addition, such conductors must be protected especially against mechanical instabilities which are caused by conductor movements, since these instabilities can lead to a warming of the conductors causing them to go into a normally conducting state.

To take up such forces, the superconductors, which are generally ribbon shaped, can each be surrounded by a jacket which consists of reinforcement material which has a higher mechanical strength than the normally conducting stabilizing material. A superconductor design of this kind is disclosed in German Offenlegungsschrift No. 26 02 734. In a magnet winding, such a superconductor structure can then be directly braced against the superconductor structure adjacent to it using these jackets. While large forces can be transmitted with this bracing method, there is generally no space between adjacent jackets for conducting the coolant which is necessary for cooling the superconductor. In addition, the thermal conductivity of the reinforcement material of the jackets, generally, is also less than that of the stabilizing material of the superconductors. In the known superconductor structure, the interior enclosed by the jacket, in which the superconductor itself is also arranged, therefore contains several additional cavities which are used for conducting a coolant in the lengthwise direction of the conductor.

The known superconductor structure is manufactured by arranging a ribbon shaped superconductor, which contains a normally conducting matrix material, for instance, of copper, in which individual superconducting strands are embedded, in a corresponding recess between two support parts, likewise of normally conducting material, for instance, the matrix material, which are to be put together. The two support parts thereby form a body of normally conducting material, in which the superconductor proper is enclosed. In addition, cavities serving as cooling ducts are provided in the body formed by the support parts. After the two support parts are joined together, for instance, by welding, to form the body, they are additionally completely enclosed on their outside by a jacket of sheet steel. For this purpose, a metal sheet is bent around the common body formed by the two support parts and is welded together at its longitudinal sides abutting in the lengthwise direction of the conductor. However, the manufacture of such a superconductor structure is relatively expensive, paticularly because of the required support parts.

SUMMARY OF THE INVENTION

It is therefore an object of the present invention to improve the known superconductor structure in such a manner that it can be manufactured relatively easily and without adverse effects on the cooling of the superconductor enclosed therein and on its capacity to absorb forces.

According to the present invention, this problem is solved, for a superconductor structure of the type mentioned at the outset, by using a jacket which consists of a metal sheet which is bent around the superconductor and which is pre-profiled in such a manner that it contains strip-shaped zones which extend in the longitudinal direction of the conductor and which are in direct contact with the superconductor; and by spacing the remaining strip-like zones, which extend between the zones resting against the superconductor, from the surface of the superconductor, so that channel like outer depressions are formed in the jacket. Filler strips of a thickness such that their outer flat sides, together with the outer parts of the jacket, at least approximately form a smooth outer surface of the superconductor structure, are disposed in the outer depressions.

The advantages of this design of the superconductor structure are in particular that commercially available finished sheet metal can be used, into which the desired pre-profile is formed, for instance, by corrugating. The metal sheets, so preprofiled, then fulfill a double function. For one, with these sheets and the filler strips a jacket of great mechanical strength can be made, which can take up the forces occurring in a large superconducting magnet coil without undesired deformation of the superconductors. Secondly, the special preprofiling of the sheets forms cooling ducts for directly cooling the superconductor in a simple manner, without the need for additional parts for this purpose. Such a superconductor structure can therefore be manufactured relatively simply and accordingly is cost effective.

According to a further embodiment of the superconductor structure of the present invention, the filler strips advantageously consist of the material of the preprofiled sheet metal. These filler strips can advantageously be fastened in the outer channel-like depressions of the jacket by rolling them in, welding them in or cementing them in. When the superconductor structure is cooled down, there will be no difference in shrinkage between the material of the jacket and that of the filler strips, so that additional stressing of the joint between the filler strips and the jacket is prevented.

For fabricating such a superconductor structure according to the present invention, a smooth sheet of pre-determined width is first shaped, during a non-cutting, forming operation, into a metal sheet with the channel like depressions. Subsequently, the sheet, so preprofiled, is placed around the ribbon like superconductor and closed to form a jacket, and finally, the outer channel like depressions of the jacket are filled in with the filler strips.

This process can advantageously be carried out continuously and, therefore, in a particularly cost effective manner.

DETAILED DESCRIPTION OF THE INVENTION

Figure 1:
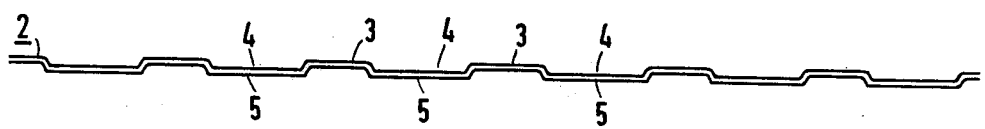
FIG. 1 is a diagrammatic view of a preprofiled tape for use as a jacket in a superconductor structure according to the present invention.

The metal tape 2 shown in FIG. 1 in cross section consists of a material which has greater mechanical strength than the normally conducting materials generally used for stabilizing superconductors. Therefore, VA, e.g., stainless steel, for instance, can be provided as the tape material. The metal tape 2 is preprofiled by means of a noncutting shaping operation in such a manner that it contains strip like, zones 3, extending lengthwise. Relative to zones 3 the remaining zones 5 of the tape are depressed. A suitable shaping method is, for instance, corrugating or another profile rolling method. In such a shaping operation, the tape 2 is therefore formed, as seen over its cross section, into several channel-like depressions 4, which extend in the longitudinal direction parallel to each other. The number and the width of these channel-like depressions depend on the requirements as to the mechanical strength of the jacket to be made from the metal tape 2. The depressed tape zones 5 lie in a common plane which is parallel to the plane of the tape portions 3 which are raised relative to the former. Thus, a meander-like shape of the tape 2 is obtained as viewed in cross section.

With such a preprofiled metal tape, a superconductor structure according to the present invention can now be fabricated. One embodiment of a corresponding superconductor is illustrated in cross section in FIG. 2. For conducting the current in this structure, a central ribbon shaped superconductor 7 of approximately rectangular cross section, the long edges of which are rounded, is used. This superconductor 7, not detailed in the figure, contains conductor parts of superconductive material, which are stabilized with a normally conducting material. It consists, for instance, of a copper matrix, in which superconducting $Nb_3Sn$ filaments are embedded. It can also be put together from a multiplicity of individually stabilized superconductor wires to form a ribbon-like structure. As is further indicated in the figure by a dashed line, the superconductor 7 can contain a central core 8 for mechanical reinforcement, which consists, for instance, of VA-steel.

The preprofiled metal tape shown in FIG. 1 is now bent around this central superconductor 7 to form a firm enclosing jacket 9. The width of the metal tape is selected so that, after the bending operation, the long sides 10 and 11 of the tape approximately abut. These long sides can then be welded, cemented or soldered together.

Due to the meander-shaped cross section shape of the metal tape, the jacket 9 formed by this tape then only partially rests directly against the surface 13 of the superconductor 7. These contact making zones of the jacket are designated as 14 in the figure. The remaining zones 15 are thus spaced from the surface 13, so that between them and the superconducting surface 13, respective cavities 16 extending in the longitudinal direction of the conductor are created. Through these cavities 16, a coolant, e.g., liquid helium, can advantageously be conducted, to cool the superconductor 7 directly.

Figure 2:
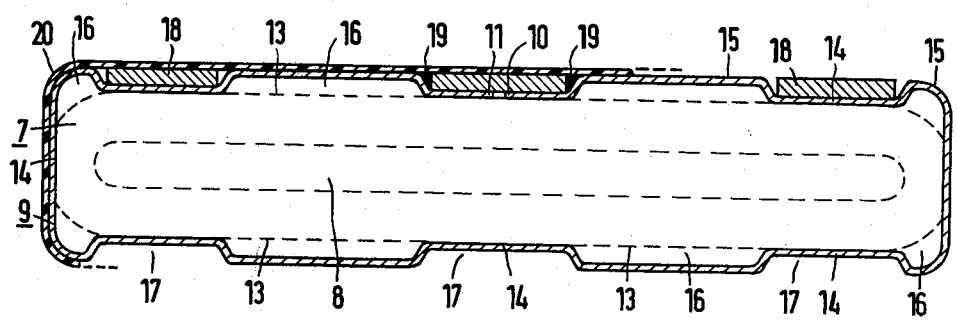
FIG. 2 is a diagrammatic cross sectional view of an embodiment of such a superconductor structure.

The outer channel like depressions 17 in the jacket 9 are subsequently filled out with corresponding metal strips 18, so that the outer surfaces of these filler strips, together with the adjacent strip shaped zones of the jacket 9, present an at least approximately smooth outer surface of the superconductor structure. The filler strips 18, of which only a few are shown in FIG. 2, in the depressions 17 of the jacket 9, advantageously consist of the material of the jacket 9. They can advantageously be cemented or rolled into the depressions 17 or also welded to the metal tape of the jacket 9. In this manner, the jacket can also be joined together at the long sides 10 and 11 of the metal tape to form a closed structure which firmly encloses the superconductor 7. In the figure, only the middle filler strip, covering the two long sides 10 and 11 is illustrated as being welded to the jacket 9 with weld seams 19, although the other filler strips can also be attached similarly. The welding can be performed, for instance, with an argon arc.

The superconductor structure fabricated in this manner has an approximately rectangular cross section with rounded edges and at least approximately smooth surfaces. In general, it will further be provided with insulation 20, only partly detailed in the figured, for instance, by wrapping. This insulation can consist, for instance, of fiberglass-reinforced plastic and may optionally also secure the filler strips 18 in the outer depressions 16.

With such a superconductor structure, a multi-layer magnet coil can now advantageously be wound, the mutually insulated turns of which are in direct contact with each other and which can take up large tensile forces in the direction of the conductor axis and compression forces perpendicular to this axis.

What is claimed is:

1. A conductor structure comprising:
   (a) at least one inner ribbon shaped superconductor which is stabilized with normally conducting material, said superconductor extending in the longitudinal direction of said structure;
   (b) a jacket which consists of a reinforcement material with a mechanical strength higher than the normally conducting stabilizing material, formed by a metal sheet which is bent around said superconductor with the longitudinal edges of said metal sheet abutting and joined to each other so as to completely and immovably enclose said superconductor;
   (c) said sheet preprofiled so that it contains first strip like zones which extend in the longitudinal direction of the conductor and make direct contact with the superconductor and second strip like zones extending between the first zones and spaced from the surface of the superconductor, the space between said second zones and said superconductor forming channels in the interior of said structure for conducting a cooling medium in the longitudinal direction of the conductor, said first and second zones also forming channel like depressions in the outside jacket; and
   (d) filler strips of a thickness such that their outer flat sides, together with the outer parts of the jacket form at least approximately a smooth outer surface of the superconductor structure, disposed in and essentially filling said depressions in the outside of said jacket to form an approximately smooth outside surface for the conductor structure.

2. The structure according to claim 1, wherein said preprofiled metal sheet is made of steel.

3. The structure according to claim 1 wherein said filler strips are made of the same material as said preprofiled metal sheet.

4. A method for manufacturing a superconductor structure comprising:
   (a) shaping an initially smooth metal sheet with a predetermined width, in a non-cutting forming operation, into a preprofiled metal sheet with longitudinally extending channel like depressions;
   (b) subsequently, placing said preprofiled metal sheet around a longitudinally extending ribbon shaped superconductor and closing said sheet to form a jacket, so as to form within said jacket longitudinally extending inner and outer channels extending parallel to said longitudinally extending conductors; and
   (c) finally, filling the outer channel like depressions of the jacket with filler strips.

5. A manufacturing method according to claim 4, wherein said step of shaping comprises corrugating the initially smooth metal sheet.

6. A manufacturing method according to claim 4, wherein said step of shaping comprises giving the initially smooth metal sheet a shape of meander-like cross section in a profile rolling device.

7. A manufacturing method according to claim 4, and further including joining said preprofiled metal sheet together at its abutting long sides to form a completely closed jacket.

8. A manufacturing method according to claim 7, wherein said long sides are joined by welding, cementing or soldering said abutting long sides together.

9. A manufacturing method according to claim 4 and further including fastening said filler strips in the outer channel like depressions of said jacket.

10. A manufacturing method according to claim 9, wherein said filler strips are fastened by rolling, welding or cementing the filler strips into the channel like depressions.

11. A manufacturing method according to claim 4 and further comprising surrounding said closed jacket, including said filler strips arranged in its outer, channel-like depressions, with insulation.

12. A manufacturing method according to claim 11, comprising wrapping the jacket, including the filler strips, with the insulating material.

13. A manufacturing method according to claim 12, comprising wrapping with a fiberglass reinforced plastic tape.

14. A manufacturing method according to claim 4 comprising carrying out said steps in a continuous manufacturing cycle.

* * * * *